United States Patent
Hirano et al.

(10) Patent No.: US 9,835,286 B2
(45) Date of Patent: Dec. 5, 2017

(54) FIXTURE FOR PIPING

(71) Applicant: Sumitomo Riko Company Limited, Komaki-shi, Aichi-ken (JP)

(72) Inventors: Tomohiro Hirano, Komaki (JP); Masanori Kawabata, Komaki (JP); Takahiro Asai, Ichinomiya (JP); Takaki Nakashima, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 249 days.

(21) Appl. No.: 14/619,532

(22) Filed: Feb. 11, 2015

(65) Prior Publication Data
US 2015/0276122 A1  Oct. 1, 2015

(30) Foreign Application Priority Data

Mar. 26, 2014  (JP) .................. 2014-063352

(51) Int. Cl.
| | |
|---|---|
| *F16B 21/08* | (2006.01) |
| *B60K 15/035* | (2006.01) |
| *F16M 13/02* | (2006.01) |
| *F16L 3/00* | (2006.01) |
| *F16L 5/00* | (2006.01) |

(Continued)

(52) U.S. Cl.
CPC .......... *F16M 13/02* (2013.01); *F16B 21/086* (2013.01); *F16L 3/00* (2013.01); *F16L 5/00* (2013.01); *F16L 41/023* (2013.01); *F16L 47/26* (2013.01); *F16L 47/32* (2013.01); *F16M 13/005* (2013.01); *B60K 2015/03509* (2013.01); *Y10T 137/85954* (2015.04)

(58) Field of Classification Search
CPC ................ F16B 21/086; F16B 21/088; B60K 2015/03509; B60K 2015/03538; B60K 2015/03552; B60K 2015/03576
USPC ....... 137/171, 172, 173, 177, 179, 197, 587, 137/588; 24/297; 293/155; 52/716.5, 52/716.6, 716.7; 411/508
See application file for complete search history.

(56) References Cited

U.S. PATENT DOCUMENTS 3,800,978 A * 4/1974 Sigwald ............... B60K 15/035
                                              137/587
4,122,583 A * 10/1978 Grittner ............. B60R 13/0206
                                              24/297

(Continued)

FOREIGN PATENT DOCUMENTS

| JP | S64-015512 A | 1/1989 |
|---|---|---|
| JP | 2605160 Y2 | 6/2000 |

(Continued)

OTHER PUBLICATIONS

Sep. 12, 2017 Office Action issued in Japanese Application No. 2014-063352.

*Primary Examiner* — Jessica Cahill
*Assistant Examiner* — Jonathan Waddy
(74) *Attorney, Agent, or Firm* — Oliff PLC

(57) ABSTRACT

A fixture for piping includes a fitting. The fitting includes a base, and a locking tab. The locking tab has an end fixed onto the base, and one or more folding sections. The locking tab is formed as a folding configuration folded twice or more, and is further formed so as to be inclinable by elastic deformation about the end and the one or more folding sections serving as a fulcrum, respectively, thereby being locked up with a hole in a vehicle body.

13 Claims, 4 Drawing Sheets

(51) Int. Cl.
*F16M 13/00* (2006.01)
*F16L 47/26* (2006.01)
*F16L 41/02* (2006.01)
*F16L 47/32* (2006.01)

(56) References Cited

U.S. PATENT DOCUMENTS

| | | | | |
|---|---|---|---|---|
| 4,495,380 | A * | 1/1985 | Ryan | F16B 21/082 174/138 D |
| 5,689,863 | A * | 11/1997 | Sinozaki | F16B 19/1081 24/297 |
| 5,775,861 | A * | 7/1998 | Leon | F16B 5/0642 24/297 |
| 6,471,313 | B1 * | 10/2002 | Ueda | F16B 5/0642 24/297 |
| 6,634,840 | B1 * | 10/2003 | Salmon | F16B 19/1081 411/344 |
| 2005/0115615 | A1 | 6/2005 | Takayanagi et al. | |
| 2009/0211064 | A1 * | 8/2009 | Robson | F16B 5/0635 24/297 |
| 2009/0300893 | A1 * | 12/2009 | Herrmann | B60R 11/02 24/595.1 |
| 2013/0219798 | A1 * | 8/2013 | Sato | B62D 25/24 49/463 |
| 2013/0287518 | A1 * | 10/2013 | Scroggie | F16B 5/065 411/78 |

FOREIGN PATENT DOCUMENTS

| | | |
|---|---|---|
| JP | 2000-352477 A | 12/2000 |
| JP | 2001-260666 A | 9/2001 |
| JP | 2003-056532 A | 2/2003 |
| JP | 2005-163836 A | 6/2005 |
| JP | 2007-223534 A | 9/2007 |
| JP | 4264297 B2 | 5/2009 |

* cited by examiner

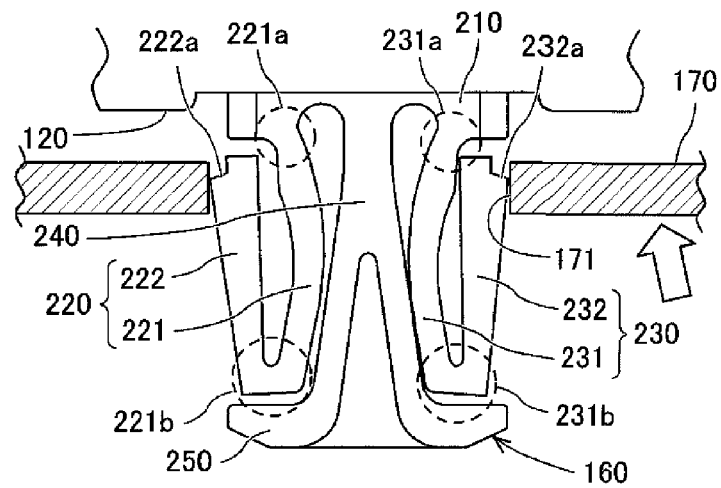
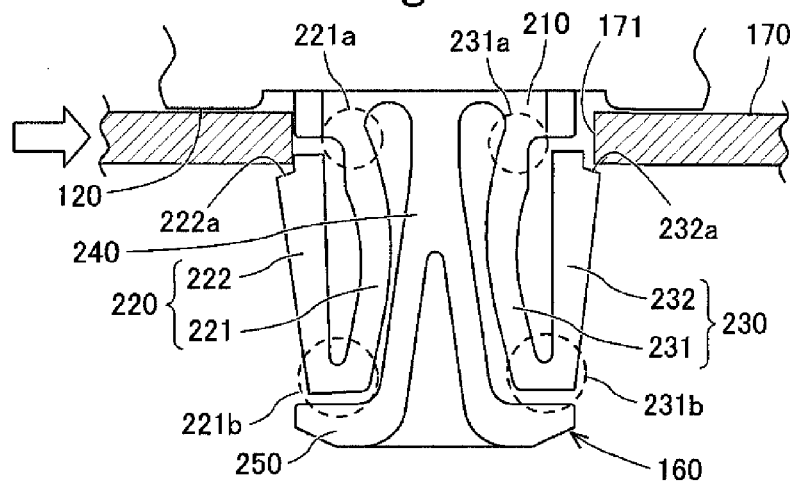
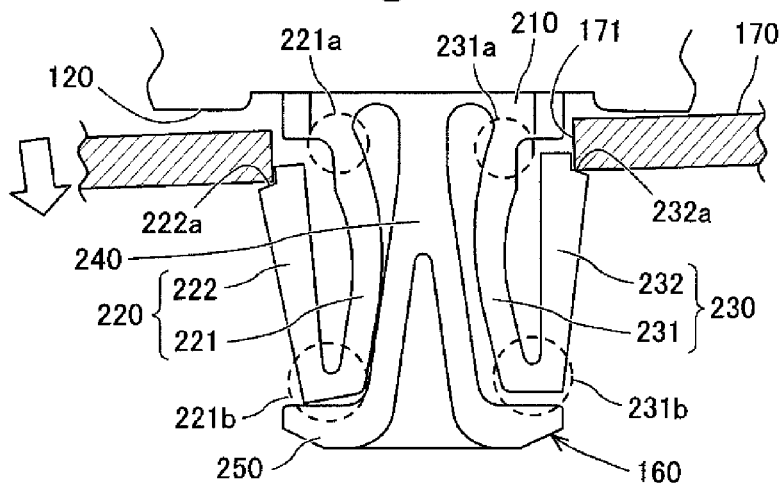

FIXTURE FOR PIPING

INCORPORATION BY REFERENCE

The present invention is based on Japanese Patent Application No. 2014-063352, filed on Mar. 26, 2014, the entire contents of which are incorporated herein by reference.

BACKGROUND OF THE INVENTION

Field of the Invention

The present invention relates to a fixture for piping, the fixture made of resin and fixing the piping onto a vehicle body.

Description of the Related Art

Fixtures for piping to be installed onto piping are disclosed in publications on the related art (see Japanese Unexamined Patent Publication (KOKAI) Gazette No. 2005-163836, Japanese Patent Gazette No. 4264297, Japanese Registered Utility Model Gazette No. 2605160, and Japanese Unexamined Patent Publication (KOKAI) Gazette No. 2001-260666, for instance). The fixtures comprise a fitting to be fitted into a vehicle body. The fitting includes a locking tab being able to deform elastically.

A conventional locking tab inclines mostly about a fulcrum disposed at a predetermined location. Note herein that the locking tab has been lowered in the durability when the locking tab deforms in a great magnitude, because resin is used as a material to make a fixture for piping, including the locking tab. On the other hand, the fixture becomes likely to come off from a vehicle body because the locking tab exerts a small locking force to the vehicle body when the locking tab deforms in a small magnitude. Accordingly, the fixture has been made of a resinous material whose fracture strain is large relatively. Consequently, the degree of freedom has been less in selecting the material.

SUMMARY OF THE INVENTION

It is an object of the present invention to provide a fixture for piping, fixture which can exert a large locking force and can securely exhibit durability, while enhancing the degree of freedom in the selection of material for making the fixture.

For example, a fixture for piping according to the present invention is a fixture fixing piping onto a vehicle body, is made of resin, and comprises: a fixture body installed onto the piping; and a fitting disposed integrally with the fixture body, and fitted into a hole in the vehicle body. The fitting includes: a base; and a locking tab having an end fixed onto the base, and one or more folding sections, the locking tab formed as a folding configuration folded twice or more, and further formed so as to be inclinable by elastic deformation about the end and the one or more folding sections serving as a fulcrum, respectively, thereby being locked up with the hole in the vehicle body.

The locking tab not only deforms elastically about the end serving as a first fulcrum, but also deforms elastically about the one or more folding sections serving as a second fulcrum. That is, the locking tab deforms elastically about at least two locations serving as a fulcrum, respectively. Therefore, the locking tab exhibits a small deformation magnitude at each of the fulcrums. As a result, it is possible to secure durability for the fixture for piping according to the present invention, even when a resinous material whose fracture strain is small is used for making the present piping fixture.

Under the circumstances, the locking tab exerts an enlarged locking force because the locking tab deforms in a great magnitude as a whole, Embodiment modes suitable for carrying out the fixture for piping according to the present invention will be hereinafter described. However, the present piping fixture shall not be limited to the following proper embodiment modes. For example, it is also allowable that the fitting can be disposed so as to be exposed outside the vehicle body, and can include: a pillar erected onto the base; and a guard disposed onto the pillar, and placed on a more opposite side of the base than the locking tab.

When the fitting is exposed outside the vehicle body, such a fear might possibly arise that the fitting collides with flying stones. However, since the fitting includes a guard, flying stones collide with the guard, so that flying stones are prevented from colliding with the locking tab. Even when the one or more folding sections exhibit lower strength than do the other parts in order to make them function as a fulcrum of the inclining locking tab, the folding sections upgrade in the longevity because they can avoid the collisions with flying stones.

Moreover, it is even permissible that the guard can inhibit the locking tab from moving greatly toward the opposite side of the base beyond a predetermined magnitude. When the vehicle body is subjected to a force that acts on the vehicle body in a direction in which it is pulled out from the fitting, the guard controls deformations of the locking tab. Therefore, it is possible to have the locking tab deform in a deformation magnitude that does not go beyond the fracture strain of a used resinous material. As a result, the locking tab upgrades in the durability securely.

In addition it is also allowable that the locking tab can include a first element; and that the pillar can inhibit the first element of the locking tab from inclining greatly beyond a predetermined magnitude when the first element inclines about the end of the locking tab serving as a fulcrum. The pillar controls deformations of the locking tab's first element about the locking tab's end. Therefore, it is possible to have the locking tab deform at the end in a deformation magnitude that does not go beyond the fracture strain of a used resinous material. As a result, the locking tab upgrades in the durability securely.

Moreover, it is even permissible that the fitting can include the locking tab in a quantity of two, and the pillar in a quantity of one; and that the pillar can be disposed between the two locking tabs, and can inhibit each first element of the two locking tabs from inclining greatly beyond a predetermined magnitude. The fitting is simplified in the structure because the one and only pillar inhibits the two locking tabs from inclining.

In addition, it is also allowable that a part of the base at least can get into the hole of the vehicle body, thereby inhibiting the vehicle body from moving to the direction at right angles to the penetration direction of the hole of the vehicle body. Thus, the present piping fixture can inhibit pull-out forces exerted in various directions from acting on the vehicle body.

Moreover, it is even permissible that the locking tab can be formed as a folding configuration folded twice; and that the locking tab can have an end, and another end coming in contact with the end, thereby inhibiting the vehicle body from moving to the direction at right angles to the penetration direction of the hole of the vehicle body. Thus, the present piping fixture can inhibit pull-out forces exerted in various directions from acting on the vehicle body.

In addition, it is even permissible that the other end of the locking tab can have a groove into which a rim forming the hole in the vehicle body is fitted; and that the groove can inhibit the vehicle body from moving in opposite penetration directions in the hole in the vehicle body. Thus, the vehicle body and the fitting become less likely to rattle to each other when the vehicle body is fitted into the groove at the other end of the locking tab in the fitting.

Moreover, it is also allowable that the groove can have a bottom and an opening, and can be formed as a tapered shape expanding from the bottom toward the opening; and that the locking tab can have a farthest end formed as a shape of curved protrusion. When forces act on the vehicle body in a direction against being pulled out (or an anti-pull-out direction), it is possible to make stresses acting on the groove smaller because the groove has a tapered shape. Furthermore, it is possible to make the stresses concentrate less at the farthest end of the locking tab because the farthest end has a shape of curbed protrusion. That is, the present piping fixture upgrades at the fitting in the durability.

In addition, it is even permissible that the fixture can be applied to a breather line connecting a fuel tank with a filler pipe; that the fixture body can include: a first attaching portion installed onto an end of a first breather pipe; a second attaching portion installed onto an end of a second breather pipe; and a third attaching portion installed onto an end of a suction pipe; and that the first breather pipe can be communicated at another end thereof with an upper space inside the fuel tank, thereby making a pipe for exhausting air within the fuel tank to an outside of the fuel tank; the second breather pipe can be communicated at another end thereof with the filler pipe, thereby making a pipe for exhausting air, which comes from the fuel tank and then passes through the first breather pipe, toward the filler pipe; and the suction pipe can be communicated at another end thereof with the fuel tank, thereby making a pipe for sucking in a liquid fuel, which is reserved in the fixture body, and then returning the liquid fuel toward the fuel tank. That is, the present piping fixture becomes applicable to joints to be connected with suction pipes.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 6 is an enlarged diagram illustrating the fitting when the piping fixture shown in FIG. 2 is being fitted into an attaching portion in a vehicle body so that the attaching portion is moved relatively to the fitting in the direction of a blank arrow shown in FIG. 6.

FIG. 7 is another enlarged diagram illustrating the fitting when the piping fixture shown in FIG. 2 has been fitted into the attaching portion in the vehicle body so that the attaching portion is moved relatively to the fitting in the horizontal direction (i.e., in the direction of a blank arrow shown in FIG. 7).

FIG. 8 is still another enlarged diagram illustrating the fitting when the piping fixture shown in FIG. 2 has been fitted into the attaching portion of the vehicle body so that the attaching portion is moved relatively to the fitting in the direction of a blank arrow shown in FIG. 8.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

First Embodiment (1) Entire Fuel Line

A fuel line, to which a fixture (hereinafter being referred to as "joint") for piping according to First Embodiment of the present invention is applied, will be described hereinafter with reference to FIG. 1. The fuel line in First Embodiment refers to a line from a liquid-fuel supply port to an internal combustion engine (not shown) in an automobile. However, to describe the fuel line in First Embodiment, some intermediate part of the fuel line from the liquid-fuel supply port to a fuel tank therein is exemplified hereinafter.

The fuel line comprises a fuel tank 10, a filler pipe 20, and a breather line 30. Note that, though not shown, another fuel line exists to supply a liquid fuel from the fuel tank 10 to an internal combustion engine. The fuel tank 10 reserves a liquid fuel, such as gasoline, therein. The liquid fuel reserved in the fuel tank 10 is supplied to a not-shown internal combustion engine to drive the internal combustion engine.

The filler pipe 20 is a pipe connecting the fuel line from a fuel-filler port 21 to the fuel tank 10. A fuel-filler cap 22 is mounted onto the fuel-filler port 21. When a not-shown fuel-filler nozzle is inserted into the fuel-filler port 21 to supply a liquid fuel from the fuel-filler nozzle, the liquid fuel passes through the filler pipe 20 to be reserved in the fuel tank 10. Then, when the liquid fuel fully fills up the fuel tank 10, the liquid fuel is reserved in the filler pipe 20 to touch the fuel-filler nozzle's leading end, and thereby the liquid-fuel supply by the fuel-filler nozzle stops automatically.

The breather line 30 connects the fuel tank 10 with some part of the filler pipe 20 in the vicinity of the fuel-filler port 21. The breather line 30 is a pipe for exhausting air within the fuel tank 10 to the outside of the fuel tank 10, upon supplying the liquid fuel to the fuel tank 10 by way of the filler pipe 20.

Figure 1:
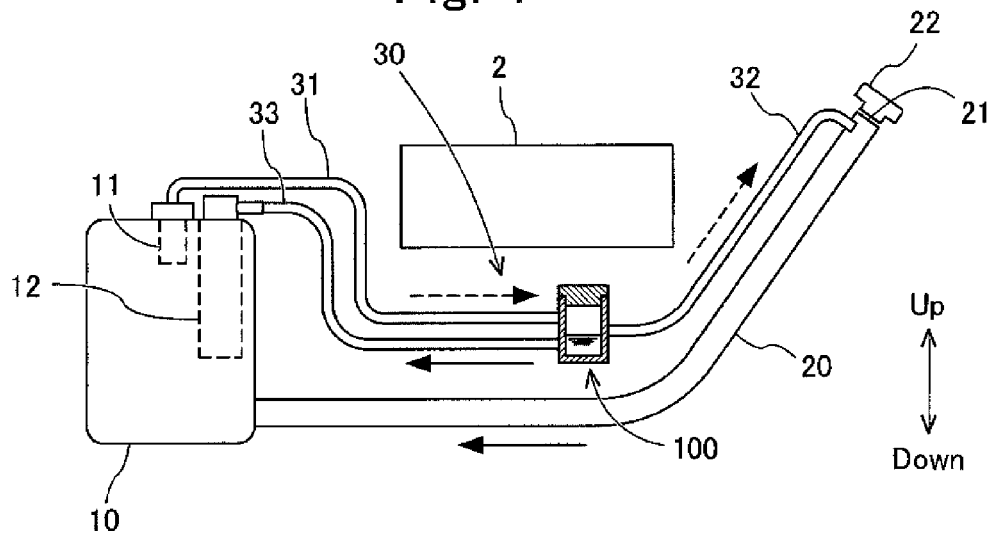
FIG. 1 is an overall-view diagram illustrating a fuel line to which a fixture for piping according to First Embodiment of the present invention is applied.

As illustrated in FIG. 1, the breather line 30 hangs downward at the intermediate part because an automobile's frame 2 exists. That is, the breather line 30 is connected at one of the opposite ends with an upper part of the fuel tank 10, and is connected at the other one of the opposite ends with some part of the filler pipe 20 in the vicinity of the fuel-filler port 21. Moreover, the intermediate part of the breather line 30 is placed down below the upper part of the fuel tank 10, and is also placed down below the vicinity of the fuel-filler port 21.

Note herein that, when air is exhausted from the fuel tank 10, the vaporized fuel is exhausted simultaneously through the breather line 30. Moreover, the vaporized fuel, which is exhausted from the fuel tank 10, has been liquefied to be reserved in the intermediate part of the breather line 30 because the intermediate part hangs downward.

Hence, in First Embodiment, the breather line 30 comprises a first breather pipe 31, a second breather pipe 32, a suction pipe 33, and a joint 100 (equivalent to the claimed "fixture for piping" according to the present invention), which connects the pipes 31 through 33 with each other, in order to return the liquefied fuel being reserved in the intermediate part of the breather line 30 to the fuel tank 10.

The joint 100 is disposed at a position in some part of the breather line 30, which hangs downward, so as to reserve the liquefied fuel existing at the part hanging downward in the breather line 30. The first breather pipe 31 is a pipe, which is installed onto the joint 100 at one of the opposite ends and is communicated with an upper space within the fuel tank 10 at the other one of the opposite ends, for exhausting air within the fuel tank 10 to the outside of the fuel tank 10. The first breather pipe 31 is connected at the other one of the opposite ends with a cut-off valve 11, which is disposed in an upper part of the fuel tank 10. That is, when the cut-off valve 11 is opened, air within the fuel tank 10 is exhausted to the first breather pipe 31.

The second breather pipe 32 is a pipe, which is installed onto the joint 100 at one of the opposite ends and is communicated with some part of the filler pipe 20 in the vicinity of the fuel-filler port 21 at the other one of the opposite ends, for exhausting air, which has come from the fuel tank 10 to pass through the first breather pipe 31, to the filler pipe 20. That is, air within the fuel tank 10 passes through the cut-off valve 11, the first breather pipe 31, the joint 100 and the second breather pipe 32 in this order, and is eventually exhausted to some part of the filler pipe 20 in the vicinity of the fuel-filler port 21.

The suction pipe 33 is a pipe, which is installed onto the joint 100 at one of the opposite ends and is communicated with the fuel tank 10 at the other one of the opposite ends, for sucking in the liquid fuel being reserved in the joint 100 and then returning it toward the fuel tank 10. The suction pipe 33 is connected at the other one of the opposite ends with a pump 12, which is arranged inside the fuel tank 10. That is, a suctioning force of the pump 12 returns the liquid fuel being reserved in the joint 100 to the fuel tank 10 by way of the suction pipe 33.

As described above, even when a liquid fuel comes to be reserved in the intermediate part of the breather line 30, it is possible to return the reserved liquid fuel to the fuel tank 10 by way of the suction pipe 33. Therefore, the first breather pipe 31 and second breather pipe 32 function reliably as a path in which air within the fuel tank 10 is exhausted.

(2) Detailed Construction of Joint

Figure 2:
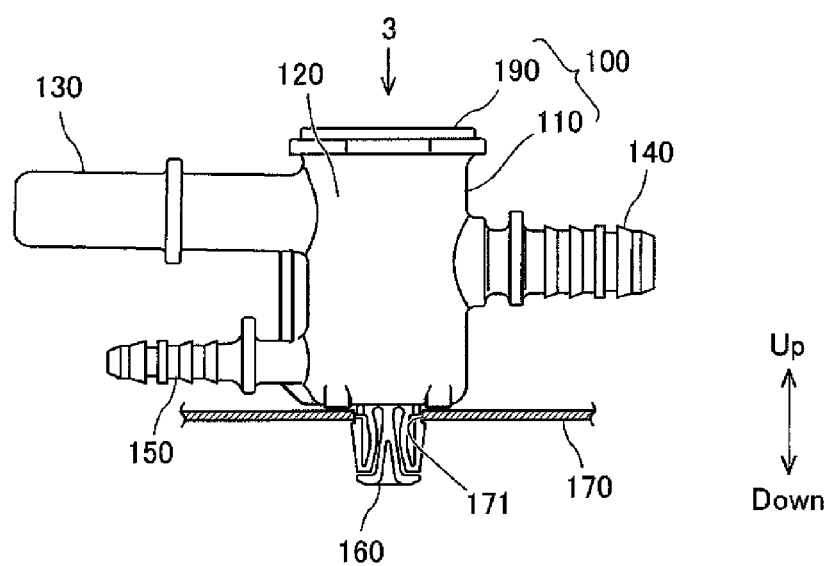
FIG. 2 is a front-view enlarged diagram illustrating the piping fixture shown in FIG. 1.

Next, a detailed construction of the joint 100 will be described with reference to FIGS. 2 through 4. FIGS. 2 and 4 illustrate an upper side of the joint 100, which is mounted onto an automobile, on the upper side in each of the drawings, and a lower side of the mounted joint 100, on the lower side in each of the drawings.

Figure 3:
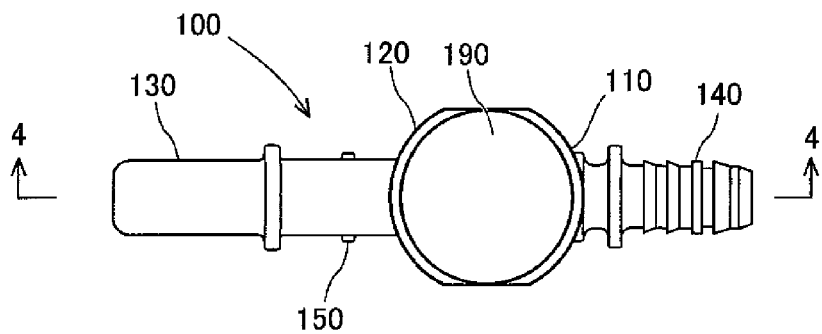
FIG. 3 is a diagram illustrating the piping fixture viewed in the direction of arrow "3" shown in FIG. 2.
Figure 4:
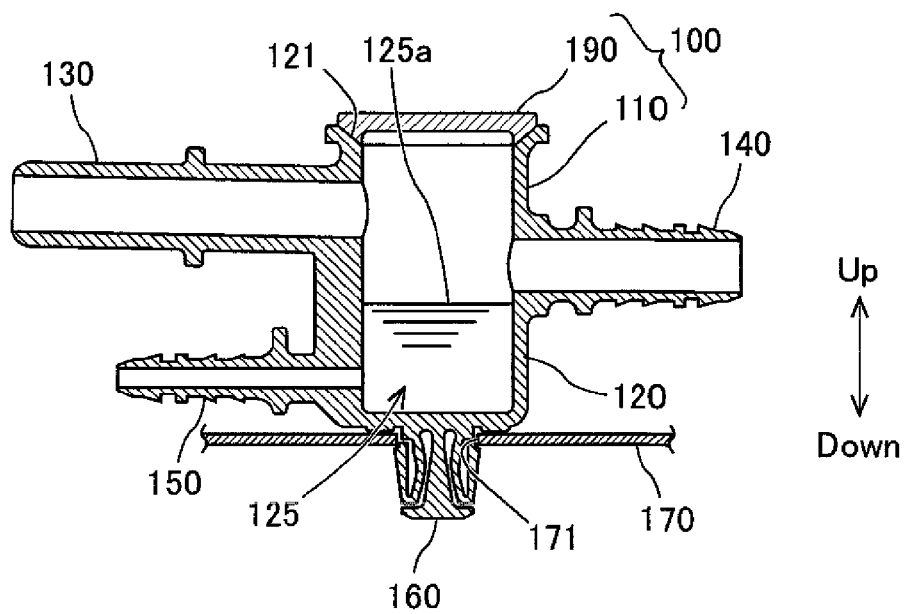
FIG. 4 is a cross-sectional diagram illustrating the piping fixture viewed in the direction of arrows "4"-"4" shown FIG. 3.

As illustrated in each of FIGS. 2 through 4, the joint 100 comprises a joint body 110 made of resin, and a lid 190 made of resin. The joint body 110 is molded integrally as a whole. The lid 190 is formed independently of the joint body 110, and is molded integrally as a whole.

The joint body 110 comprises a reservoir 120, a first attaching portion 130, a second attaching portion 140, a third attaching portion. 150, and a fitting 160. Note herein that the parts of the joint body 110 other than the fitting 160 are equivalent to the claimed "fixture body" according to the present invention. As illustrated in FIG. 4, the reservoir 120 is formed as a bottomed-cylindrical shape having an opening 121. That is, the joint body 110 includes a reserving area 125, which is able to reserve a liquid fuel inside the reservoir 120. Note herein that, in First Embodiment, the joint body 110 is arranged so as to place the bottom down below, and so as to place the opening 121 up above. Therefore, the reservoir 120 includes the reserving area 125 on its own lower side, and includes the opening 121 on its own upper side above the reserving area 125.

The first attaching portion 130 is formed as a cylindrical shape, is disposed so as to protrude diametrically from some part of an outer peripheral face of the reservoir 120, and is molded integrally with the reservoir 120. Specifically, the first attaching portion 130 is disposed at a position in a certain part of the outer peripheral face of the reservoir 120 on a side of the opening 121. That is, the first attaching portion 130 has an inner opening, which opens at a position in some part of the reservoir 120 adjacent to the opening 121.

As illustrated in FIG. 4, the inner opening of the first attaching portion 130 (i.e., the opening on a side of the reservoir 120) opens above a liquid level 125a of a liquid fuel within the interior reserving area 125 in the reservoir 120. The first breather pipe 31 is installed at one of the opposite ends onto an outer face of the first attaching portion 130. In particular, the first attaching portion 130 is installed onto one of the opposite ends of the first breather pipe 31 that is placed at the lowermost end, as shown in FIG. 1.

The second attaching portion 140 is formed as a cylindrical shape, is disposed so as to protrude diametrically from some part of an outer peripheral face of the reservoir 120, and is molded integrally with the reservoir 120. The outer peripheral face of the second attaching portion 140 is formed as a bamboo-like shape, namely, as an irregular shape in the axial direction, so as to make the second attaching portion 140 likely to be hooked up with a mating member, for instance. Specifically, the second attaching portion 140 is disposed at a position in a certain part of the outer peripheral face of the reservoir 120 on a side of the opening 121, but is disposed so as to protrude in the opposite direction to the first attaching portion 130. That is, the second attaching portion 140 has an inner opening, which opens at a position in some part of the reservoir 120 adjacent to the opening 121.

As illustrated in FIG. 4, the inner opening of the second attaching portion 140 (i.e., the opening on a side of the reservoir 120) opens above the liquid level 125a of the liquid fuel within the interior reserving area 125 in the reservoir 120. The second breather pipe 32 is installed at one of the opposite ends onto an outer face of the second attaching portion 140. In particular, the second attaching portion 140 is installed onto one of the opposite ends of the second breather pipe 32 that is placed at the lowermost end, as shown in FIG. 1.

The third attaching portion 150 is formed as a cylindrical shape, is disposed so as to protrude diametrically from some part of an outer peripheral face of the reservoir 120, and is molded integrally with the reservoir 120. The third attaching portion 150 protrudes in the same direction as the first attaching portion 130 protrudes. The outer peripheral face of the third attaching portion 150 is formed as a bamboo-like shape, namely, as an irregular shape in the axial direction, in the same manner as that of the second attaching portion 140 is formed, for instance. Specifically, the third attaching portion 150 is disposed at a position in a certain part of the outer peripheral face of the reservoir 120 on the bottom side. That is, the third attaching portion 150 has an inner opening, which is formed to open below the inner openings of the first attaching portion 130 and second attaching portion 140.

As described above, the reserving area 125 being able to reserve a liquid fuel therein is formed in the lower interior of the reservoir 120. Thus, the inner opening of the third attaching portion 150 opens to the reserving area 125 inside the reservoir 120 in some part of an inner peripheral face of the reservoir 120. The suction pipe 33 is installed at one of the opposite ends onto an outer face of the third attaching portion 150. Therefore, the liquid fuel, which exists in the reserving area 125 of the reservoir 120, is returned back to the fuel tank 10 reliably by way of the third attaching portion 150 and suction pipe 33.

The fitting 160 is disposed in a bottom outer face of the reservoir 120, and is molded integrally with the reservoir 120. The fitting 160 is fitted detachably into a hole 171 in the vehicle body 170 of an automobile. Therefore, the joint 100 is fixed onto the vehicle body 170 by fitting the fitting 160 into the hole 171.

The lid 190 is formed independently of the joint body 110, and is mounted by welding so as to close the opening 121 of the reservoir 120. The lid 190 is not connected with any member at all, other than the reservoir 120.

(3) Details of Fitting

A detailed configuration of the fitting 160 will be hereinafter described with reference to FIG. 5. The fitting 160 comprises a base 210, two locking tabs (220, 230), a pillar 240, and a guard 250.

The base 210 is disposed integrally with the reservoir 120. The base 210 is formed as a rectangular planar shape so as to correspond to a rectangular configuration of the hole 171 in the vehicle body 170. The base 210 is positioned to the vehicle body 170 to such an extent that it shows ricketiness or wobbliness slightly to the hole 171 when the base 210 enters the hole 171 partially. That is, the base 210 has an outer shape that is slightly smaller than that of the hole 171. Moreover, the base 210 is chamfered at the four corners so that it can enter the hole 171 reliably.

The two locking tabs (220, 230) are formed respectively as a twice-folded folding configuration, and are molded integrally with the base 210. The locking tabs (220, 230) comprise first elements (221, 231), and second element (222, 232). In the twice-folded folding configuration, the first elements (221, 231) are disposed adjacent to the base 210, whereas the second elements (222, 232) are disposed ahead of the first elements (221, 231) to turn back to the base 210 but keep away from it.

The first elements (221, 231) are formed as an configuration curving slightly in an arc shape, respectively. The first elements (221, 231) are fixed onto the base 210 at one of the opposite ends (221a, 231a), respectively. Moreover, the first elements (221, 231) are formed so as to be inclinable by elastic deformation about their ends (221a, 231a) (i.e., about their trailing ends) serving as a fulcrum, respectively. To be precise, the first elements (221, 231) are formed thinner in thickness at around some part in the vicinity of the ends (221a, 231a) than are the other parts, respectively.

The second elements (222, 232) are disposed on a more outer side than are the first elements (221, 231). The second elements (222, 232) are fixed at one of the opposite ends (i.e., the trailing end) onto the other one of the opposite ends (i.e., the leading end) of the first elements (221, 231), respectively. Moreover, the second elements (222, 232) are formed so as to be inclinable by elastic deformation about the other one of the opposite ends (i.e., about the trailing end) serving as a fulcrum, respectively. That is, the second elements (222, 232) incline about folding sections (221b, 232b) between the first elements (221, 231) and the second elements (222, 232). The folding sections (221b, 231b) herein serve as a fulcrum, respectively.

Moreover, the second elements (222, 232) are provided with cut-offs (222a, 232a) on an outer side of their farthest end, respectively. Thus, when the cut-offs (222a, 232a) are placed at a rim forming the hole 171, the second elements (222, 232) are locked up with the rim in a penetration direction in the hole 171, and are further locked up with the rim in a perpendicular direction to the penetration direction in the hole 171.

Figure 5:
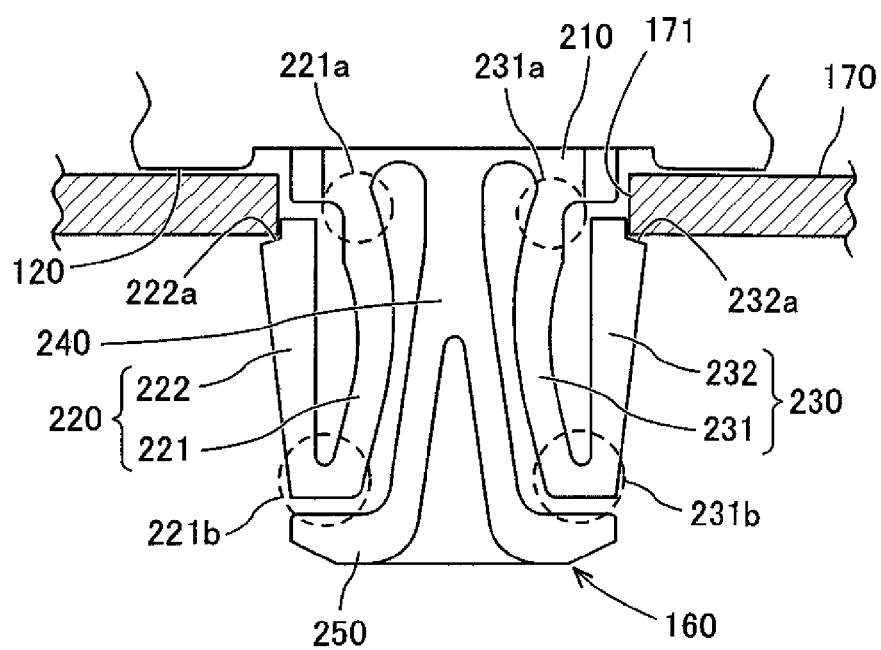
FIG. 5 is an enlarged diagram illustrating a fitting of the piping fixture shown in FIG. 2.

That is, as illustrated in FIG. 5, since the two locking tabs (220, 230) deform elastically, it is feasible for the elastically-deformed locking tabs (220, 230) to pass through the hole 171 in the vehicle body 170. Thus, the locking tabs (220, 230) are locked up with the rim forming the hole 171.

The pillar 240 is erected onto the base 210, and is disposed between the two locking tabs (220, 230). The pillar 240 has a width formed so as to become thicker from the base 210 toward the leading end. Moreover, the pillar 240 is formed so as to have a gap between itself and the first elements (221, 231) when the first elements (221, 231) are not deformed. The one and only pillar 240 functions as a stopper inhibiting each of the first elements (221, 231) from inclining beyond a predetermined magnitude when each of the first elements (221, 231) inclines about the one of the opposite ends (221a, 231a) (i.e., about the trailing end) of the first elements (221, 231) serving as a fulcrum. Thus, the fitting 160 is simplified in the structure, because the one and only pillar 240 controls the two inclining locking tabs (220, 230).

The guard 250 is disposed integrally on one of the sides of the pillar 240 that is opposite to the base 210. Moreover, the guard 250 is disposed to face the folding sections (221b, 231b (i.e., the connections between the first elements (221, 231) and the second elements (222, 232)) on one of the sides of the pillar 240 that is opposite to the base 210. When the fitting 160 is exposed outside the vehicle body 170, the guard 250 prevents flying stones from colliding directly with the locking tabs (220, 230). Even when the folding sections (221b, 231b) of the locking tabs (220, 230) exhibit lower strength than do the other parts in order to make the folding sections (221b, 231b) function as the fulcrum of the inclining locking tabs (220, 230), the folding sections (221b, 231b) are upgraded in the longevity because it is possible to keep them from colliding with flying stones.

In addition, the guard 250 is formed to provide a gap between itself and the folding sections (221b, 231b) of the two locking tabs (220, 230). Thus, the guard 250 functions as a stopper inhibiting each of the locking tabs 220, 230) from moving beyond a predetermined magnitude when the locking tabs (220, 230) move to in an opposite direction with respect to the base 210.

(4) Fitting During Deformation

With reference FIG. 6, descriptions will be made hereinafter on how the joint 100 according to First Embodiment operates and effect advantages when the fitting 160 is fitted into the hole 171 in the vehicle body 170. When the two locking tabs (220, 230) are not deformed, the maximum width of the locking tabs (220, 230) is larger than the width of the hole 171. Consequently, the locking tabs (220, 230) deform elastically, as shown in FIG. 6, when they go into the hole 171.

On this occasion, not only the first elements (221, 231) incline about one of the opposite ends (221a, 231a) (i.e., about the trailing end) serving as a fulcrum, but also the second elements (222, 232) incline about the folding sections (221b, 231b) (i.e., about their trailing ends) serving as a fulcrum. Under the circumstances, the two locking tabs (220, 230) pass through the hole 171.

Thus, not only the two locking tabs (220, 230) incline about each of the ends (221a, 231a) (i.e., the trailing ends) serving as a first fulcrum, but also they incline about each of the folding sections (221b, 231b) (i.e., the trailing ends) serving as a second fulcrum. That is, the locking tabs (220, 230) incline elastically about the two locations serving as fulcrums. Therefore, the locking tabs (220, 230) deform in a small magnitude at the respective fulcrums. As a result, the locking tabs (220, 230) can secure durability even when they are made of a resinous material exhibiting small fracture strain. In this instance, however, the locking tabs (220, 230) exert a large locking force because they deform in a large magnitude as a whole.

Incidentally, the vehicle body 170 moves relatively to the fitting 160 in such a direction that inclines slightly off from the penetration direction in the hole 171 in the vehicle body 170, as shown in FIG. 6, when the fitting 160 is fitted into the hole 171. If so, the locking tab 230 deforms greatly toward the pillar 240 (i.e., in a direction perpendicular to the penetration direction in the hole 171). Consequently, the first element 231 of the locking tab 230 inclines to such an extent that it comes in contact with the pillar 240. Moreover, the second element 232 of the locking tab 230 inclines to such an extent that it comes in contact with the one of the opposite ends 231a (i.e., the trailing end) of the first element 231.

That is, the pillar 240 inhibits the locking tab 230 from moving greatly at the other one of the opposite ends (i.e., at the leading end) of the first element 230 beyond a predetermined position (or magnitude) at which the first element 231 comes in contact with the pillar 240. Moreover, the one of the opposite ends 231a (i.e., the trailing end) of the locking tab 230 inhibits the locking tab 230 from moving greatly at the other one of the opposite ends of the second element 232 (i.e., at its leading or free end close to but away from the base 210) beyond a predetermined position (or magnitude) at which the second element 232 comes in contact with the one of the opposite ends 231a of the first element 231 (i.e., its trailing end fixed to the base 210).

Thus, the pillar 240 controls the inclining movements of the two locking tabs (220, 230) about the one of the opposite ends (221a, 231a) of the first elements (221, 231) serving as a fulcrum. Not that the inclining movements have eventually resulted in the deformations of the first elements (221, 231) in the locking tabs (220, 230). Therefore, it is possible to set the deformation magnitude at the one of the opposite ends (221a, 231a) of the first elements (221, 231) so as not to go beyond fracture strain exhibited by a resinous material used to make the first elements (221, 231). In addition, it is possible to set the deformation magnitude at the folding sections (221b, 231b) of the second elements (222, 232) so as not to go beyond fracture strain exhibited by a resinous material used to make the second elements (222, 232). As a result, the locking tabs (220, 230) upgrade in the durability securely.

Subsequently, with reference to FIG. 7, descriptions will be made hereinafter on how the joint 100 according to First Embodiment operates and effects advantages when the fitting 160 moves relatively to the hole 171 in the vehicle body 170 in the horizontal direction (i.e., one of opposite directions perpendicular to the penetration direction in the hole 171) after the fitting 160 has been fitted into the hole 171.

The base 210 comes in contact with a rim forming the hole 171 partially at least. Therefore, the base 210 inhibits the vehicle body 170 from moving relatively to the fitting 160 in the horizontal direction. On this occasion, the locking tab 220 deforms slightly toward the pillar 240. That is, the base 210, which inhibits the fitting 160 from moving relatively to a rim forming the hole 171, comes to control the locking tab 220 in the deformation magnitude.

Next, with reference to FIG. 8, descriptions will be made hereinafter on how the joint 100 according to First Embodiment operates and effect advantages when the vehicle body 170 exerts a force to the fitting 160 in the pull-out direction after the fitting 160 has been fitted into the hole 171 in the vehicle body 170. The "force acting on the fitting 160 in the pull-out direction" refers to a force arising in such a direction that inclines slightly off from the penetration direction in the hole 171.

In this instance, a rim forming the hole 171 is kept on being locked up with the other one of the opposite ends of the second element 222 (i.e., its leading or free end) in the locking tab 220. Consequently, the second element 222 in the locking tab 220 moves toward the guard 250. Therefore, the second element 220 comes in contact with the guard 250 at around the folding section 221b (i.e., its trailing end), so that the second element 220 is inhibited from moving in the penetration direction in the hole 171. Moreover, the first element 221 in the locking tab 220 comes in contact with the pillar 240, so that the first element 221 is controlled in the inclining magnitude. Therefore, it is possible to set the deforming magnitude in the locking tabs (220, 230) so as not to go beyond fracture strain exhibited by a resinous material used to make the locking tabs (220, 230). As a result, the locking tabs (220, 230) upgrade in the durability securely.

Second Embodiment

Figure 9:
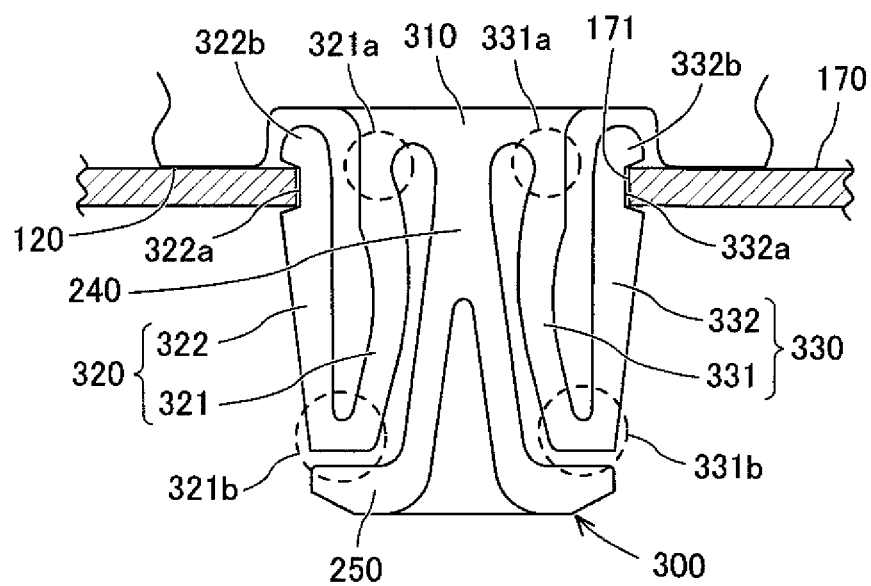
FIG. 9 is a front-view enlarged diagram illustrating a fitting of a fixture for piping according to Second Embodiment of the present invention.

A fitting 300 of a fixture for piping according to Second Embodiment will be hereinafter described with reference to FIG. 9. The fitting 300 comprises a base 310, two locking tabs (320, 330), a pillar 240, and a guard 250. The pillar 240 and guard 250 are constructed in the same manner as those in First Embodiment.

The base 310 is disposed integrally with a reservoir 120 (shown in FIG. 2). The base 310 is smaller than a hole 171 in a vehicle body 170 in size sufficiently.

The two locking tabs (320, 330) are formed as a twice-folded folding configuration, and are molded integrally with the base 310, respectively. The locking tabs (320, 330) comprise first elements (321, 331) disposed adjacent to the base 310 in the twice-folded configuration, and second elements (322, 332) disposed ahead of the first elements (321, 331) to turn back to the base 310 but kept away from it. The first elements (321, 331) are formed so as to be able to incline about one of their opposite ends (321a, 331a) (i.e., about their trailing end) serving as a fulcrum by elastic deformation. The first elements (321, 322) are identical with the first elements (221, 231) in First Embodiment virtually.

The second elements (322, 332) are formed so as to be able to incline about folding sections (321b, 331b) (i.e., their trailing or fixed ends) serving as a fulcrum by elastic deformation. The second elements (322, 332) include grooves (322a, 332a) into which a rim forming the hole 171 in the vehicle body 170 is fitted at the other one of their opposite ends (i.e., their leading or free end). The grooves (322a, 332a) inhibit the vehicle body 170 from moving back and forth relatively in the opposite penetration directions in the hole 171. Thus, ricketiness or wobbliness becomes smaller between the vehicle body 170 and the fitting 300 after the vehicle body 170 has been fitted into the grooves (322a, 332a) in the fitting 300.

To be more precise, the grooves (322a, 332a) are formed as a tapered shape expanding from the bottom toward the opening. Moreover, the second elements (322, 332) are formed as a shape of curved protrusion at their farthest ends (322b, 332b). When a force acts on the vehicle body 170 in an anti-pull-out direction (i.e., in the upward direction in FIG. 9), it is possible to make a stress acting on the grooves (322a, 332a) smaller because the grooves (322a, 332a) have the tapered shape. In addition, it is possible to make a stress concentration smaller in the farthest ends (322b, 332b) because the farthest ends (322b, 332b) have a shape of curved protrusion. That is, the fitting 300 upgrades in the durability.

Figure 10:
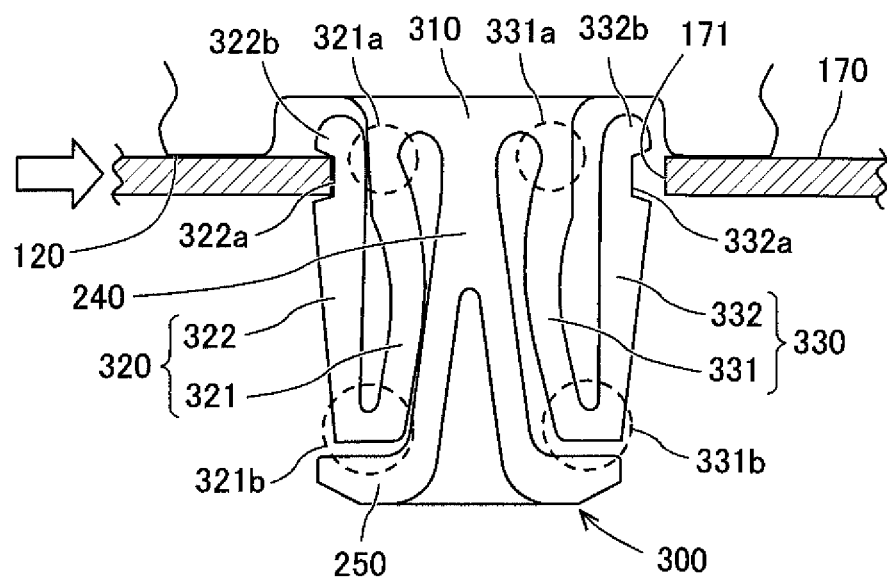
FIG. 10 is an enlarged diagram illustrating the fitting when the piping fixture shown in FIG. 9 has been fitted into an attaching portion of a vehicle body so that the attaching portion is moved relatively to the fitting in the horizontal direction (i.e., in the direction of a blank arrow shown in FIG. 10).

Subsequently, with reference to FIG. 10, descriptions will be made hereinafter on how the fitting 300 directed to Second Embodiment operates and effects advantages when the fitting 300 moves relatively to the hole 171 in the vehicle body 170 in the horizontal direction (i.e., one of opposite directions perpendicular to the penetration direction in the hole 171) after the fitting 300 has been fitted into the hole 171.

When the locking tab 320 deforms toward the pillar 240 greatly, the first element 321 in the locking tab 320 inclines until it comes in contact with the pillar 240. Moreover, the second element 322 in the locking tab 320 inclines until it comes in contact with the one of the opposite ends 321a (i.e., the trailing or fixed end) of the first element 321. That is, the pillar 240 inhibits the first element 320 from moving greatly at the other one of the opposite ends (i.e., at the leading end or the folding section 321b) beyond a position (or a predetermined magnitude) at which the first element 321 comes in contact with the pillar 240 at the other one of the opposite ends (i.e., at the leading end or the folding section 321b). In addition, one of the opposite ends 321a of the locking tab 320 (i.e., its trailing or fixed end) inhibits the second element 322 from moving greatly at the other one of the opposite ends (i.e., at the leading or free end) beyond a position (or a predetermined magnitude) at which the second element 322 comes in contact with the one of the opposite ends 321a (i.e., the trailing or fixed end of the first element 321) at the other one of the opposite ends (i.e., at the leading or free end).

Others

In above-described First and Second Embodiments, the two locking tabs (220, 230) E. (320, 330) are formed so as to be able to incline by elastic deformation about one of their opposite ends (221a, 231a) & (321a, 331a) and the one of the folding section (221b, 231b) & (321b, 331b) serving as a fulcrum, respectively. In addition to the arrangement, the locking tabs (220, 230) & (320, 330) can allowably comprise three or more folding sections so that they can be formed so as to be able to incline by elastic deformation about one of their opposite ends and two or more of the resulting three folding sections serving as a fulcrum, respectively.

Moreover, in above-described First and Second Embodiment, the fittings 160 & 300 are constructed to comprise the two locking tabs (220, 230) & (320, 330). Besides the construction, the fittings 160 & 300 can permissibly be constructed to comprise one of the locking tabs (220, 320) or (230, 330) alone. In addition, in above-described First and Second Embodiments, the piping fixture according to the present invention is exemplified by the joint 100 to which a number of pipes are installed respectively at one of their opposite ends. In addition to the joint 100, it is also possible to apply the present piping fixture to a resin clip not only retaining (or griping) the outer peripheral face of a pipe but also fixed onto a vehicle.

Having now fully described the present invention, it will be apparent to one of ordinary skill in the art that many changes and modifications can be made thereto without departing from the spirit or scope of the present invention as set forth herein including the appended claims.

What is claimed is:

1. A fixture for piping and for fixing the piping onto a vehicle body, the fixture being made of resin and comprising:
    a fixture body installed onto the piping; and
    a fitting, integral with the fixture body, that is fitted into a hole in the vehicle body so that the fitting is exposed outside the vehicle body, the fitting including:
        a base;
        a locking tab having a first end fixed onto the base, having one or more folding sections, and being inclinable by elastic deformation about the first end and the one or more folding sections serving as fulcrums to thereby be locked up with the hole in the vehicle body;
        a pillar erected onto the base and projecting from the hole to the outside of the vehicle body; and
        a guard disposed on the pillar and located farther from the base than the locking tab, wherein:
    the pillar is spaced apart from the locking tab in a state where (i) the fitting is fitted in the hole of the vehicle body and (ii) the locking tab is not inclined about its first end that serves as one of the fulcrums; and
    when the fitting is fitted in the hole and relatively moves in a direction that is perpendicular to a penetration direction of the hole of the vehicle body, a second end of the locking tab comes into contact with the first end of the locking tab to inhibit the vehicle body from moving toward the fitting beyond a predetermined magnitude in the direction that is perpendicular to the penetration direction of the hole of the vehicle body.

2. The fixture according to claim 1, wherein the guard inhibits the locking tab from moving away from the base beyond a predetermined magnitude.

3. The fixture according to claim 1, wherein:
    the locking tab includes a first element; and the pillar inhibits the first element from inclining beyond a predetermined magnitude when the first element inclines about the first end of the locking tab serving as one of the fulcrums.

4. The fixture according to claim 3, wherein:
the fitting includes two locking tabs and a single pillar;
the pillar is located between the two locking tabs; and
the pillar inhibits the first element of each of the two locking tabs from inclining beyond the predetermined magnitude.

5. The fixture according to claim 4, wherein the two locking tabs are disposed symmetrically to one another with respect to the pillar.

6. The fixture according to claim 1, wherein a part of the base is in the hole of the vehicle body, thereby inhibiting the vehicle body from moving relative to the fitting beyond the predetermined magnitude in the direction that is perpendicular to the penetration direction of the hole of the vehicle body.

7. The fixture according to claim 1, wherein:
the second end of the locking tab has a groove into which a rim forming the hole in the vehicle body is fitted; and
the groove inhibits the vehicle body from moving relative to the fitting beyond a predetermined magnitude in a direction opposite to the penetration direction of the hole in the vehicle body.

8. The fixture according to claim 7, wherein:
the groove has a bottom and an opening;
the groove has as a tapered shape that expands toward the opening; and
the second end of the locking tab is shaped as a curved protrusion.

9. The fixture according to claim 1, wherein the locking tab has a dogleg shape including the second, leading end and the first, trailing end fixed to the base, thereby controlling inclining of the locking tab at the second end with the first end.

10. The fixture according to claim 1, wherein the second end of the locking tab is a free end with a cut-off that is locked with the hole, thereby not only inhibiting the locking tab from moving relative to the hole beyond a predetermined magnitude in the penetration direction of the hole but also inhibiting the locking tab from moving relative to the hole beyond the predetermined magnitude in the direction that is perpendicular to the penetration direction of the hole.

11. The fixture according to claim 1, wherein the pillar tapers from narrow to wide in a direction away from the base.

12. The fixture according to claim 1, wherein a gap is present between the guard and the locking tab, thereby inhibiting the locking tab from moving in a direction away from the base beyond a predetermined magnitude.

13. A fixture for piping and for fixing the piping onto a vehicle body, the fixture being made of resin and comprising:
a fixture body installed onto the piping; and
a fitting, integral with the fixture body, that is fitted into a hole in the vehicle body so that the fitting is exposed outside the vehicle body, the fitting including:
a base;
a locking tab having a first end fixed onto the base, having one or more folding sections, and being inclinable by elastic deformation about the first end and the one or more folding sections serving as fulcrums to thereby be locked up with the hole in the vehicle body;
a pillar erected onto the base and projecting from the hole to the outside of the vehicle body; and
a guard disposed on the pillar and located farther from the base than the locking tab, wherein:
the pillar is spaced apart from the locking tab in a state where (i) the fitting is fitted in the hole of the vehicle body and (ii) the locking tab is not inclined about its first end that serves as one of the fulcrums;
the fixture is applied to a breather line connecting a fuel tank with a filler pipe; and
the fixture body includes:
a first attaching portion installed onto an end of a first breather pipe that communicates at a second end thereof with an upper space inside the fuel tank, thereby making a pipe for exhausting air within the fuel tank to an outside of the fuel tank;
a second attaching portion installed onto an end of a second breather pipe that communicates at a second end thereof with the filler pipe, thereby making a pipe for exhausting air, which comes from the fuel tank and then passes through the first breather pipe, toward the filler pipe; and
a third attaching portion installed onto an end of a suction pipe that communicates at another end thereof with the fuel tank, thereby making a pipe for sucking in liquid fuel, which is reserved in the fixture body, and then returning the liquid fuel toward the fuel tank.

* * * * *